May 22, 1956 R. LUCIEN 2,746,254
HYDRAULIC BRAKE WEAR TAKE-UP DEVICE
Original Filed Jan. 3, 1951
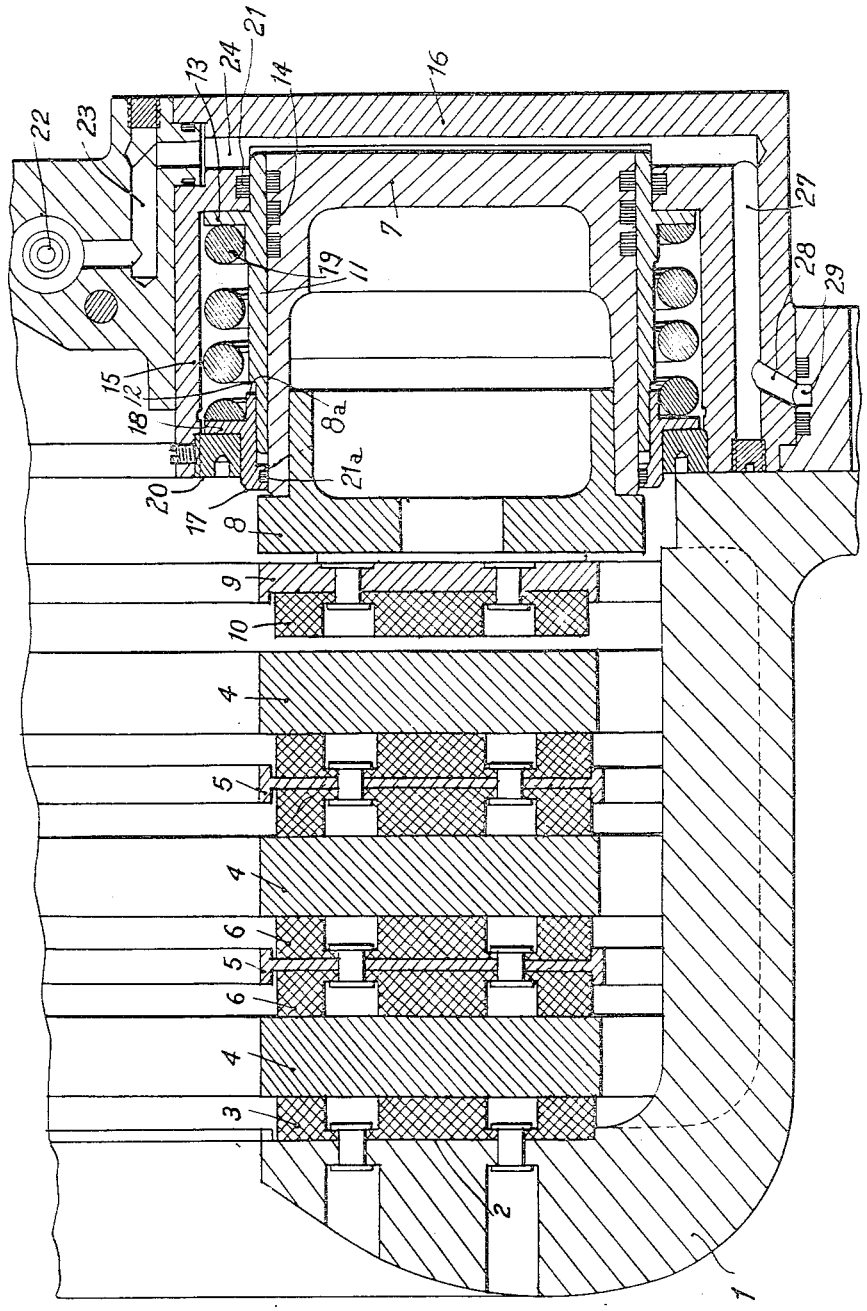
INVENTOR
RENE LUCIEN
BY:
Haseltine, Lake & Co.
AGENTS

United States Patent Office 2,746,254
Patented May 22, 1956

2,746,254

HYDRAULIC BRAKE WEAR TAKE-UP DEVICE

René Lucien, Paris, France, assignor to Societe d'Inventions Aeronautiques et Mecaniques S. I. A. M., Geneva, Switzerland, a corporation of Switzerland Original application January 3, 1951, Serial No. 204,198. Divided and this application August 14, 1952, Serial No. 304,343

Claims priority, application France June 7, 1950

7 Claims. (Cl. 60—54.6)

The present invention relates to an arrangement for taking-up play, applicable primarily to wheel brakes which are operated by fluid pressure in a brake cylinder acting against one face of a piston, the opposite face of which presses non-rotatable discs provided with brake linings against rotatable discs constrained to rotate with the wheel.

The arrangement is applicable in particular to the braking system which is the subject of U. S. patent application Serial No. 204,198, dated January 3, 1951, now Patent No. 2,667,947, filed by the present applicant, and of which this application is a division.

The object of the invention is to provide a braking system such that, whatever the state of wear of the brake linings, effective braking action commences substantially as soon as fluid under pressure is admitted to the brake cylinder. In other words, the brake is such that the brake linings of the non-rotatable discs, whatever their state of wear, remain substantially in contact with the rotatable discs after braking pressure has ceased to be exerted.

An embodiment of the invention is described hereunder, with reference to the accompanying drawing which is a cross-section of a braking system on a plane passing through the wheel axis and through the axis of a brake cylinder.

In this figure, a brake plate 1 is fixed by connection to the body of a vehicle (not shown), and has a flange or shoulder-piece 2 which carries a brake lining 3 in the form of an annulus. Mounted to rotate with the wheel and able to slide parallel with the axis thereof are annular brake discs 4, here three in number, between which are interposed further annular brake discs 5 which are non-rotatable but also able to slide parallel to the wheel axis. The discs 5 carry on each of their faces brake-linings 6. Opposite the flange or shoulder-piece 2 is a braking piston 7, and a pressure pad 8 carried by said piston bears upon a non-rotary annular brake disc 9 having a brake lining 10. Surrounding the piston 7 is a cylindrical sleeve 11 constituting an annular second piston which is also subjected to the pressure of the braking liquid. This annular piston 11 has around its circumference a flange 13 and a step or shoulder 12.

Packing rings 14, for example of tough rubber, are provided in annular grooves around the head of the piston 7, which packing rings exercise a frictional grip upon the annular piston or sleeve 11. The piston 7 and the sleeve 11 are movable in a cylinder 15 closed by an endplate 16. At the forward end of the piston 7 there is mounted a bushing 17 which is an easy sliding fit around both the piston 7 and the sleeve 11 and has an outwardly-extending flange 18. In an annular space within the cylinder 15 and around the sleeve 11 is situated a helical compression spring 19, which bears at one end upon the flange 13, and at the other upon the flange 18 which it presses against a ring member 20 fixed to the cylinder 15; between the inner face 8a of the bushing 17 and the shoulder 12 on the sleeve 11 there exists some play, which is very small in comparison with the possible total reduction in the distance or space taken up by the brake discs occasioned through wear of the brake linings. A packing ring 21 exerts a frictional grip on the sleeve 11, but much lesas than that of the three rings 14. A further packing ring 21a serves as a seal for the exclusion of dirt and dust. Liquid under pressure for operating the brake is supplied at an inlet 22 and is led through ducts 23, 24 to the end of the braking cylinder. The duct 24 is extended by further ducts 27, 28 leading to an annular channel 29 which serves to conduct liquid under pressure to another braking piston arrangement (not shown) identical with the one described, and arranged symmetrically opposite thereto on the other side of the wheel axis to act in the same manner on the brake discs. The manner in which the brake acts, as well as the way in which the play, arising after a period of wear of the brake linings, is taken up, will now be explained.

Let us suppose first that the brake linings are in the new state and are as shown in the drawing. When liquid under pressure is admitted through the inlet 22, the piston 7 and its sleeve 11 are driven as one toward the left, owing to the frictional grip exerted by the rings 14, until the shoulder 12 encounters the inner face 8a of the bushing 17; the spring 19 is consequently compressed. Then the piston continues to travel to the left alone, and the disc 10 presses upon the first of the rotary brake discs 4, the pressure being transmitted to all the brake discs so that the friction of the brake linings exerts a braking action on the rotary discs. When the pressure is relieved the spring 19 returns the sleeve 11 through a distance equal to the play which existed originally between the bushing 17 and the shoulder 12, that is until the flange 13 arrives at the rearward limit of its travel. The piston 7 moves with the sleeve 11, owing to the frictional grip of the rings 14, and stops with it.

Let us suppose now that the brake linings are worn.

During braking, the piston 7 now moves toward the left further than before, say for example 24 millimetres further if each of the six brake linings has worn away for a thickness of 4 millimetres, while the sleeve 11, as formerly, cannot advance further than the gap between the shoulder 12 and the bushing 17 will allow, that is to say 3 millimetres. When the braking pressure is relieved, the sleeve 11 makes a return movement of 3 millimetres taking the piston with it, and the piston stops with the sleeve. Thus the piston stops, ready for the next brake application, in a position nearer to the brake discs by an amount equivalent to the extent of wear of the brake linings.

The arrangement according to the invention has the following important advantages: the spring 19 which effects the return movement of the parts is only subjected to very small changes in its length and always of the same magnitude, so that it may be very short and thereby enables the weight and bulk of the brake to be reduced; another advantage is that since the stroke of the spring is always the same, it works with a constant fatigue characteristic, unlike arrangements in which the spring is subject to varying elongations or contractions in accordance with the state of wear of the brake linings.

I claim:

1. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston, means positively limiting the movement of the sleeve to a predetermined small stroke in the cylinder, a compression spring abutting at one end against the sleeve and at the other end against the cylinder, and means positioned between the piston and the sleeve to exert therebetween a frictional grip causing joint movement thereof throughout said small stroke when no pressure fluid is supplied and permitting separate movement of the piston beyond the stroke of the sleeve when pressure fluid is supplied and the sleeve is actuated thereby into engagement with the stroke limiting means.

2. In combination with a hydraulic brake actuating device including a brake cylinder, a piston movable in the cylinder, and means for supplying pressure fluid to the cylinder to cause actuating movement of the piston therein; a wear take-up device comprising: a movable sleeve surrounding the piston and having a close fit in the cylinder at one end thereof, two axially spaced abutments on the sleeve, a compression spring abutting at one end against one of said abutments, an internal shoulder in the cylinder cooperating with said one abutment to limit the stroke of the sleeve toward said one end of the cylinder when urged in that direction by the spring, a ring member closing the other end of the cylinder around the piston, the compression spring abutting at the other end against the ring member and the ring member cooperating with the other of said abutments to limit the stroke of the sleeve toward said other end of the cylinder when actuated in that direction by fluid pressure, and an annular packing between the piston and the sleeve exerting a frictional grip therebetween to cause joint movement thereof toward said one end of the cylinder when no fluid pressure is supplied and to permit separate movement of the piston toward said other end of the cylinder beyond the stroke of the sleeve when pressure fluid is supplied and the sleeve is actuated thereby into engagement of said other abutment with the ring member.

3. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston, means positively limiting the movement of the sleeve to a predetermined small stroke in the cylinder between a position of rest at which no pressure fluid is supplied and an end position at which the piston is at least partly actuated, yieldable means frictionally coupling the sleeve and the piston for joint movement between said positions and resilient means for urging the sleeve back to its position of rest when the supply of pressure fluid to the cylinder is released.

4. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston, means positively limiting the movement of the sleeve to a predetermined small stroke in the cylinder between a position of rest at which no pressure fluid is supplied and an end position at which the piston is at least partly actuated, means providing frictional engagement between the piston and the sleeve to couple them for joint movement as the piston passes from the position of rest of the sleeve to the end position thereof, and resilient means returning the sleeve to its position of rest when the supply of pressure fluid to the cylinder is released.

5. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston, means positively limiting the movement of the sleeve to a predetermined small stroke in the cylinder between a position of rest at which no pressure fluid is supplied and an end position at which the piston is at least partly actuated, friction means alternately coupling the sleeve with the piston for movement jointly therewith in one direction from the position of rest of the sleeve to the end position when the piston is urged by fluid pressure away from said position of rest and coupling the piston to the sleeve for joint movement therewith in the other direction, and resilient means for urging the sleeve back to its position of rest when the supply of pressure fluid to the cylinder is released.

6. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston and movable therewith upon actuation, fixed abutments limiting the sleeve stroke in the cylinder, between a position of rest at one end of the cylinder and an end position remote from said position of rest, to a value less than the piston stroke, means urging the sleeve back to its position of rest upon release of fluid pressure in the cylinder, and friction means coupling the piston to the sleeve for the return stroke.

7. In combination with a hydraulic brake actuating device including a brake cylinder, a piston movable in the cylinder, and means for supplying pressure fluid to the cylinder to cause actuating movement of the piston therein, a wear take-up device comprising: a movable sleeve surrounding the piston and movable therewith upon actuation, fixed abutments limiting the sleeve stroke in the cylinder between a position of rest at one end of the cylinder and an end position remote from said position of rest, to a value less than the piston stroke, means urging the sleeve back to its position of rest upon release of fluid pressure in the cylinder, and at least one friction ring coupling the piston to the sleeve for the return stroke.

References Cited in the file of this patent

UNITED STATES PATENTS

| | | |
|---|---|---|
| 1,755,830 | Loughead | Apr. 22, 1930 |
| 2,002,841 | Tatter | May 28, 1935 |
| 2,227,245 | Carroll | Dec. 31, 1940 |
| 2,497,815 | Frick | Feb. 14, 1950 |
| 2,541,032 | Butler | Feb. 13, 1951 |
| 2,587,831 | Frick | Mar. 4, 1952 |

FOREIGN PATENTS

| | | |
|---|---|---|
| 587,306 | Great Britain | Apr. 21, 1947 |